(12) United States Patent
Hamada

(10) Patent No.: US 7,194,415 B2
(45) Date of Patent: Mar. 20, 2007

(54) SUPPORT SYSTEM FOR MAINTENANCE CONTRACT OF ELEVATOR

(75) Inventor: Tomoyuki Hamada, Tsuchiura (JP)

(73) Assignees: Hitachi, Ltd., Tokyo (JP); Hitachi Building Systems Co., Ltd., Tokyo (JP)

( * ) Notice: Subject to any disclaimer, the term of this patent is extended or adjusted under 35 U.S.C. 154(b) by 735 days.

(21) Appl. No.: 09/801,845

(22) Filed: Mar. 9, 2001

(65) Prior Publication Data

US 2002/0173970 A1    Nov. 21, 2002

(51) Int. Cl.
*G06Q 99/00*    (2006.01)
(52) U.S. Cl. ............................................ 705/1; 705/10
(58) Field of Classification Search .................... 705/1
See application file for complete search history.

(56) References Cited

U.S. PATENT DOCUMENTS 5,987,474 A * 11/1999 Sandifer .................. 707/104.1
6,110,214 A * 8/2000 Klimasauskas ................ 703/2
6,192,325 B1 * 2/2001 Piety et al. .................. 702/184

FOREIGN PATENT DOCUMENTS

JP    10059641 A  *  3/1998

* cited by examiner

*Primary Examiner*—John G. Weiss
*Assistant Examiner*—Michael Fisher
(74) *Attorney, Agent, or Firm*—Antonelli, Terry, Stout and Kraus, LLP.

(57) ABSTRACT

A system is provided for predicting a load degree of a customer's elevator from the information about the customer's building and elevator, creating and displaying the maintenance plan according to the load degree, and selecting a proper maintenance plan in consideration of the load degree of the customer's elevator and the customer's needs.

17 Claims, 16 Drawing Sheets

FIG. 6

PRESUMED LOAD OF CUSTOMER'S ELEVATOR

| ITEM | CUSTOMER | AVERAGE |
|---|---|---|
| MONTHLY RUNNING TIME | a | A |
| MONTHLY RUNNING DISTANCE | b | B |
| MONTHLY DOOR OPEN /CLOSE TIMES | c | C |

RETURN  NEXT

FIG. 11A 108

| CLASSIFI-CATION | SITE AREA CLASSIFYING ZONE |
|---|---|
| S1 | LESS THAN 500m² |
| S2 | 500 OR MORE TO LESS THAN 1000 |
| S3 | 1000 OR MORE TO LESS THAN 1500 |

FIG. 11B 109

| CLASSIFI-CATION | FLOOR NUMBER CLASSIFYING ZONE |
|---|---|
| H1 | LESS THAN 5 FLOORS |
| H2 | 5 OR MORE TO LESS THAN 10 FLOORS |
| H3 | 10 OR MORE TO LESS THAN 15 FLOORS |

FIG. 11C 110

| CLASSIFI-CATION | WAY-OF-USE CLASSIFYING ZONE |
|---|---|
| U1 | APARTMENT |
| U2 | OFFICE |
| U3 | SHOP |

Table 111:

| BUILDING # | LOCATION | SITE AREA | FLOOR NUMBER | WAY OF USE | USERS |
|---|---|---|---|---|---|
| 1001 | ○○ CITY ○○ STREET | 725 | 5 | APARTMENT | 215 |
| 1002 | △△ CITY △△ STREET | 1123 | 10 | OFFICE | 3710 |
| 1003 | □□ CITY □□ STREET | 2043 | 7 | SHOP | 21761 |

Table 112:

| BUILDING # | LOCATION | SITE AREA | FLOOR NUMBER | WAY OF USE | USERS |
|---|---|---|---|---|---|
| 1001 | A3 | S2 | H1 | U1 | 215 |
| 1002 | A2 | S3 | H2 | U2 | 3710 |
| 1003 | A3 | S3 | H1 | U3 | 21761 |

FIG. 13

| BUILDING CONDITION | USERS |
|---|---|
| A1 · S1 · H1 · U1 | 321 |
| A1 · S1 · H1 · U2 | 613 |
| A1 · S1 · H1 · U3 | 3123 |

| CLASSIFI-CATION | RUNNING TIME CLASSIFYING ZONE |
|---|---|
| T1 | LESS THAN 100 HOURS |
| T2 | 100 OR MORE TO LESS THAN 500 HOURS |
| T3 | 500 OR MORE TO LESS THAN 1000 HOURS |

FIG. 14B

| CLASSIFI-CATION | DOOR OPEN / CLOSE TIMES CLASSIFYING ZONE |
|---|---|
| D1 | LESS THAN 1000 TIMES |
| D2 | 1000 OR MORE TO LESS THAN 5000 TIMES |
| D3 | 5000 OR MORE TO LESS THAN 10000 TIMES |

FIG. 14C

| CLASSIFI-CATION | RUNNING DISTANCE CLASSIFYING ZONE |
|---|---|
| L1 | LESS THAN 10000m |
| L2 | 10000 OR MORE TO LESS THAN 50000m |
| L3 | 50000 OR MORE TO LESS THAN 100000m |

FIG. 15

Table 117:

| ELEVATOR # | RECORDING DATE | RUNNING TIME | DOOR OPEN / CLOSE TIMES | RUNNING DISTANCE | PART A | PART B | PART C |
|---|---|---|---|---|---|---|---|
| 1001 | 1999.4 | 312 hr | 31072 | 123015m | REPLACE-MENT | | CLEAN-UP |
| 1001 | 1999.5 | 374 hr | 32181 | 155121m | | | |
| 1001 | 1999.6 | 438 hr | 33323 | 187819m | | REPLACE-MENT | CLEAN-UP |

⇒

Table 118:

| ELEVATOR # | RUNNING TIME | DOOR OPEN / CLOSE TIMES | RUNNING DISTANCE | DRIVING SYSTEM | MACHINE ROOM | PART A | PART B | PART C |
|---|---|---|---|---|---|---|---|---|
| 1001 | T1 | D2 | L2 | ROPE | YES | 13.5 | 20.1 | 4.3 |
| 1002 | T2 | D2 | L2 | ROPE | NO | 12.3 | 19.7 | 3.3 |
| 1003 | T1 | D1 | L1 | HYDRAULIC | YES | 15.5 | 21.1 | 6.3 |

| RUNNING TIME | DOOR OPEN / CLOSE TIMES | RUNNING DISTANCE | DRIVING SYSTEM | MACHINE ROOM | PART A | PART B | PART C |
|---|---|---|---|---|---|---|---|
| T1 | D1 | L1 | ROPE | YES | 14.0 (1.0) | 31.3 (3.1) | 3.2 (1.0) |
| T1 | D1 | L2 | ROPE | YES | 14.3 (1.1) | 23.7 (2.5) | 3.3 (0.5) |
| T1 | D1 | L3 | ROPE | YES | 8.7 (1.3) | 15.3 (1.2) | 3.1 (0.5) |
|  |  |  |  |  |  |  |  |

119

SUPPORT SYSTEM FOR MAINTENANCE CONTRACT OF ELEVATOR

BACKGROUND OF THE INVENTION

1. Field of the Invention

The present invention relates to a system that is used when a customer makes a contract with a service company for maintaining an elevator.

2. Description of the Related Art

In general, the maintenance contract for an elevator is roughly divided into a full maintenance contract and a checking contract.

In the full maintenance contract, the contract is made monthly at a fixed charge. The object elevator is checked periodically, for example, at a month or three-month interval. If a maintenance man determines that a replacement of an expendable part is needed as the checked result, the expendable part is replaced with a new one and an abnormal portion is repaired as well. The replacement of the expendable and the repair of the abnormal portion request no additional charge. Any sudden failure is basically repaired at no charge.

In the checking contract, on the other hand, though the object elevator is checked at a fixed period in the same manner as the full maintenance contract, the monthly charge is an addition of a checking fee and a replacing and repairing fee, the latter of which is requested if a maintenance man determines that the replacement and the repair of an expendable are needed and then the customer approves the replacement of the expendable and the repair of the abnormal portion. In addition, any sudden failure is repaired at another charge.

When a customer makes a contract for maintenance with a service company for maintaining an elevator, the customer usually selects one of these two maintenance contracts experimentally through a commercial talk between the service company and the customer.

Some service companies prepare various options for the contract for maintaining an elevator. Those options are selected experimentally through the commercial talk between the service company and the customer as well.

It has been conventionally known an apparatus described in JP-A-7-25557 as an apparatus for creating a repairing plan of an elevator.

A frequency (load) at which a customer's elevator is used depends on some factors, such as the number of the users of the elevator installed in the customer's building, whether or not the elevator is driven continuously for 24 hours, and whether or not it is stopped regularly. Further, some customers need to operate the elevator for 24 hours, while the other customers need to allow the regular stopping of the elevator. Moreover, some customers need to lower the maintenance cost in the range where the minimum quality is kept as much as possible, while the other customers need to keep the maximum maintenance quality even if charged up to some extent.

As described above, the load imposed on the customer's elevator and the requested maintenance quality are quite variable, so that the intervals for the checking period and the replacement of an expendable are requested to be adjusted. That is, the maintenance plan is requested to be finely adjusted.

For this request, it is possible to increase the kinds of the maintenance contracts or prepare various options. However, no approximate means has been heretofore proposed for providing a maintenance plan exactly requested by a customer.

SUMMARY OF THE INVENTION

It is an object of the present invention to provide a system for selecting a proper maintenance plan by considering a degree of load of the customer's elevator and the customer's need.

In carrying out the object, according to an aspect of the invention, a support system for maintenance contract of an elevator includes input means used for inputting information containing at least one of a location, a size and a way of use of a customer's building and information about a specification of an object elevator, a database for accumulating one or more correspondences between a combination of the information containing at least one of the location, the size and the way of use of the building and the information about the specification of the elevator and the interval for the replacement of a part and the clean-up of the elevator, means for making a maintenance plan, for selecting the interval for the replacement of the expandable and the clean-up of the customer's elevator from the information about the customer's building and the elevator inputted by the input means through the use of the correspondences accumulated in the database, and display means for displaying the interval for the replacement of the expandable and the clean-up selected by the maintenance plan making means as the maintenance plan.

According to another aspect of the invention, a support system for maintenance contract of an elevator includes a load predicting database for accumulating correspondences between a combination of the information containing at least one of a location, a size and a way of use of a building and information about a specification of an object elevator and a numeric value indicating a using frequency of the elevator, a maintenance plan computing database for accumulating correspondences between a combination of the numeric value indicating the using frequency of the elevator and the information about the specification of the elevator and the interval for the replacement of the parts of the elevator and the clean-up thereof, load predicting means for specifying the numeric value indicating the frequency of use of the customer's elevator by using the correspondences accumulated in the load predicting database from the information about the customer's building and the elevator inputted by the inputting means through the use of the correspondences accumulated in the load predicting database, maintenance plan computing means for selecting an interval for replacement of parts of the elevator and the clean-up thereof from the numeric value indicating the using frequency of the customer's elevator specified by the load predicting means and the information about the specification of the customer's elevator inputted by the inputting means through the use of the correspondences accumulated in the maintenance plan computing database, and display means for displaying the interval for replacement of parts and the clean-up selected by the maintenance plan computing means as a maintenance plan.

The support system for maintenance contract of an elevator according to the invention enables to select the maintenance plane according to the load of the customer's elevator. Further, the support system provides a failure occurrence probability for each cost of the maintenance plan and details of a maintenance plan, which may be used for selecting the maintenance plan according to the customer's need.

Moreover, the support system for maintenance contract of an elevator according to the invention enables to grasp the state of the load of the elevator on the basis of the running records of the customer's elevator recorded in the running record database and change the maintenance plan on the basis of the load state. Hence, the customer having made a contract through the use of the present system may constantly enjoy the proper maintenance service.

BRIEF DESCRIPTION OF THE DRAWINGS

FIG. 6 is a view showing a screen on which a presumed load of the customer's elevator is displayed in the support system for maintenance contract of an elevator;

FIGS. 11A to 11C are tables showing a site area classifying table, a stage number classifying table, and a way-of-use classifying table for classifying the customer's buildings, respectively;

FIG. 13 is a table showing details of a load predicting database;

FIGS. 14A to 14C are tables showing a running time classifying table, a door open/close times classifying table and a running distance classifying table, respectively;

FIG. 15 is a table showing a status in which the elevators are classified according to the running time, the door open/close times, and the running distance.

DETAILED DESCRIPTION OF THE EMBODIMENTS

Figure 1:
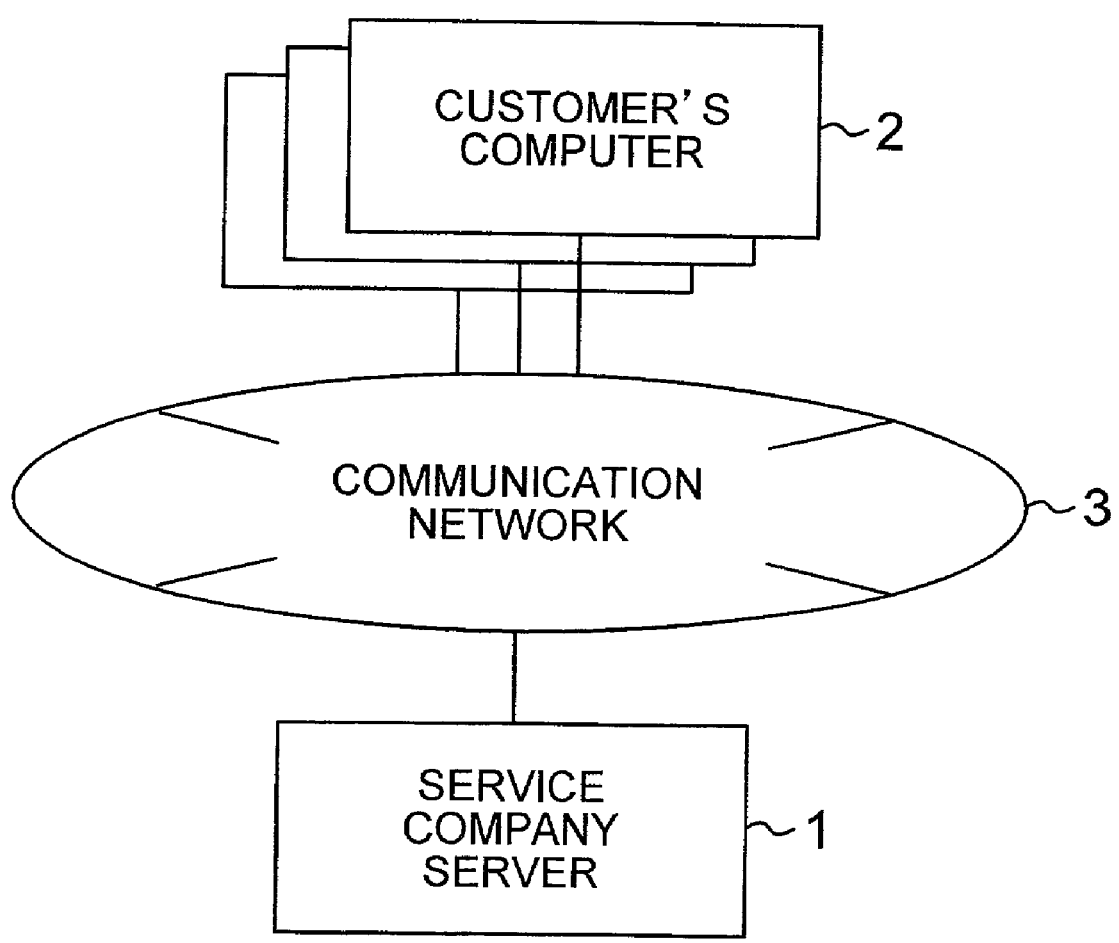
FIG. 1 is a diagram showing a support system for maintenance contract of an elevator configured on a client-server system on the internet according to an embodiment of the present invention.

Hereafter, an embodiment of the present invention will be described with reference to the appended drawings. FIG. 1 shows an embodiment of the invention in which a support system for maintenance contract of an elevator is configured as a client-server system on the internet. In FIG. 1, a numeral 1 denotes a server system for providing a maintenance contract service. A numeral 2 denotes a plurality of client systems that make access to the maintenance contract service. A numeral 3 denotes a communication network for connecting these systems.

The server system 1 may be a computer owned by a service company for providing a maintenance service of an elevator or another computer owned by a provider of a network the service company made a contract. In any case, it is installed by the service company for providing the maintenance service.

The client system 2 may be a computer owned by a customer for trying to hold the maintenance service of the elevator or another computer owned by a provider of a network contracted by a customer. In any case, it is installed by the customer who tries to hold the maintenance service.

The communication network 3 is served to connect these computers with each other for transferring digital data therebetween. It may be a public phone line, a fast data communication line, a satellite communication line or the like.

In this embodiment, the maintenance contract system is served in the hyper text of the world wide web installed on the server system within the framework thereof. It is composed of a software module to be transferred to the client system for execution and a processing program on the server system invoked by the access to the hypertext or the operation of the software module.

Figure 2:
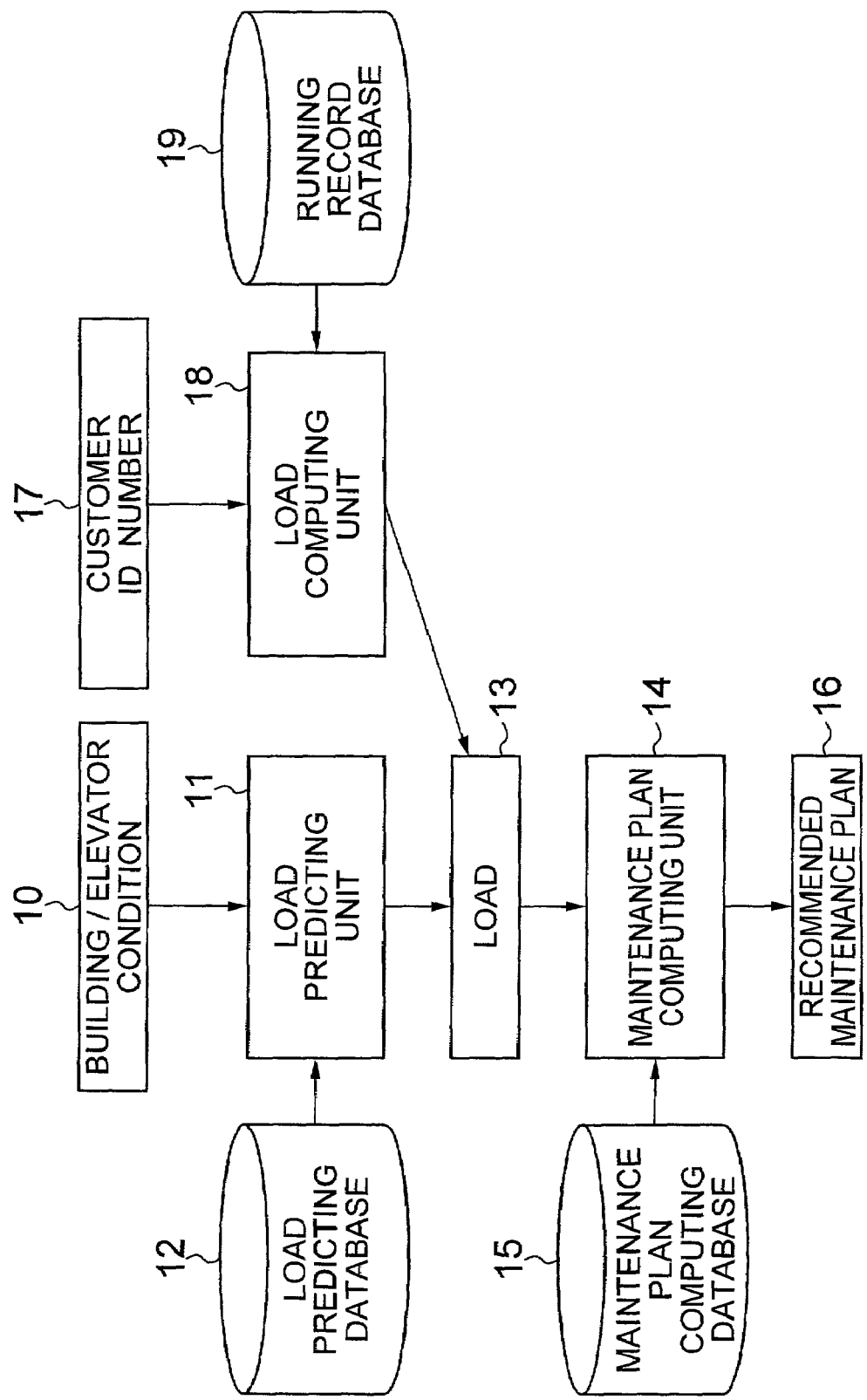
FIG. 2 is a block diagram showing a configuration of a processing program on the server system according to the embodiment of the invention.

FIG. 2 shows one configuration of the processing program on the server system. In FIG. 2, a numeral 10 denotes information about a building and an elevator of a customer to be inputted by the computer of the customer. A numeral 11 denotes a load predicting unit for predicting a load of an elevator based on the information 10. A numeral 12 denotes a load predicting database used for prediction by the load predicting unit. A numeral 13 denotes information of load of the customer's elevator predicted by the load predicting unit. A numeral 14 denotes a maintenance plan computing unit for selecting a maintenance plan recommended to the customer on the load of the elevator and computing the cost taken in executing the maintenance plan. A numeral 15 denotes a maintenance plan computing database used by the maintenance plan computing unit. A numeral 16 denotes a maintenance plan presented to the customer as a result of the computation. A numeral 17 denotes an ID number to be inputted by a customer having made contraction with the service company. A numeral 18 denotes a load computing unit for invoking a running record about the elevator of the customer from the running record database 19 by using the ID number and computing the load of the elevator of the customer.

In turn, the description will be oriented to the load computing unit for computing a load of the elevator of the customer according to an embodiment of the invention with reference to the drawing.

Figure 3:
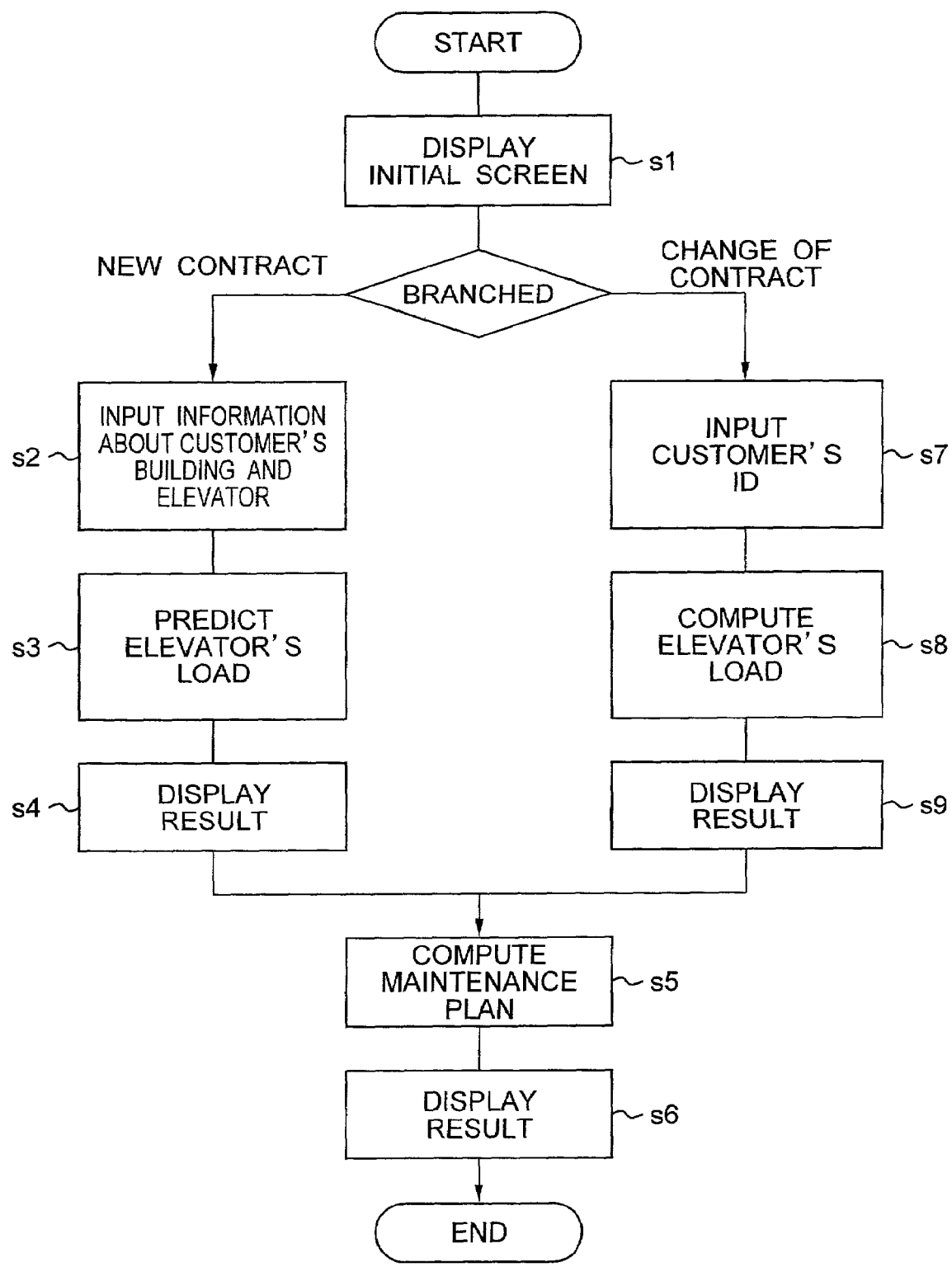
FIG. 3 is a block diagram showing a flow of a process of a support system for maintenance contract of an elevator according to the present invention.

FIG. 3 shows the flow of the process of the support system for maintenance contract of an elevator according to this embodiment. At first, a process is executed to display a head screen of the maintenance contract service (S1). On this screen, a new contract or a contract update is selected. Then, a process is executed to display a screen on which the information about a building and an elevator of a customer is to be inputted and then the information of the building and the elevator is inputted in the case of the new contract (S2).

Next, the presumed load of the customer's elevator is computed by the process of the load predicting unit 11. Then, the result is displayed (S4). In succession, the maintenance plan according to the load of the customer's elevator is computed by the process of the maintenance plan computing unit 14 based on the presumed load of the elevator (S5). Then, the result is displayed (S6). On the other hand, in the case of changing the contract, a customer's ID number is inputted (S7). The load computing unit 18 is started to compute the load from the running record about the customer's elevator (S8) and the result is displayed (S9). Like the case of making a new contract, the maintenance plan is computed by the maintenance plan computing unit 11 (S5) and the result is displayed (S6).

In turn, the description will be oriented to the transfer between the present system and the customer in each step with reference to the drawing.

Figure 4:
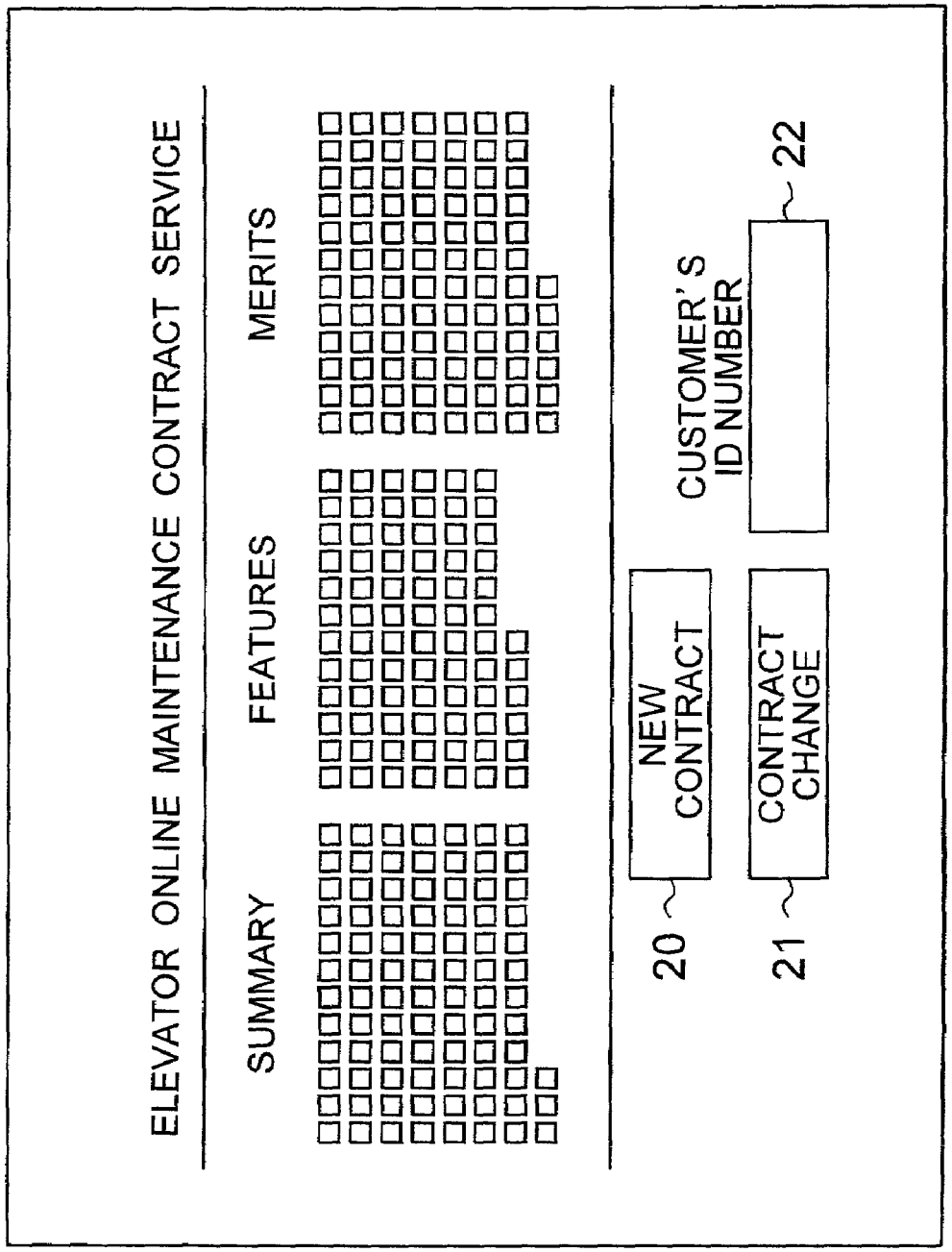
FIG. 4 is a view showing an initial screen of a support system for maintenance contract of an elevator according to the present invention.

At first, the homepage of the service company provides a link with the screen of the maintenance contract service. By clicking this link with the customer, the head screen of the maintenance contract service as shown in FIG. 4 is displayed (S1). On this screen are described the summary, the feature and the merits of the maintenance contract service.

The customer who desires to make a new maintenance contract clicks a button of "new contract" indicated by 20 in FIG. 4 so that the process goes to the next screen. Of the customers having already made a maintenance contract, the customer who tries to change the maintenance content clicks the button of "contract change" as indicated by 21 in FIG. 4 so that the process goes to the next screen. In this case, the customer's ID number having being given by the service company is inputted into the text box indicated by 22 in FIG. 4 (S7).

Figure 5:
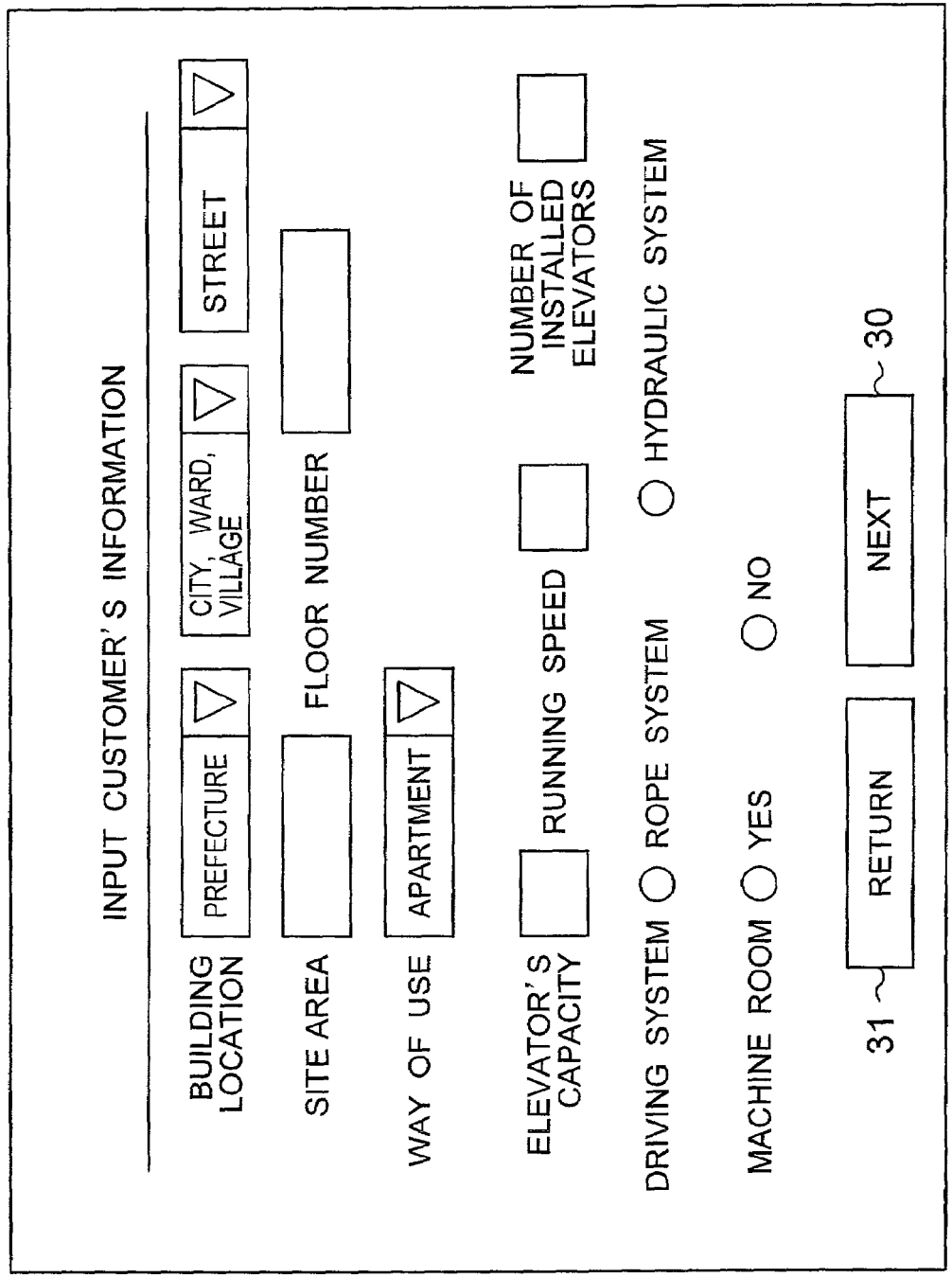
FIG. 5 is a view showing a screen on which customer's information is to be inputted in the support system for maintenance contract of an elevator.

Next, in the case of the new contract, the screen for inputting the information about the building and the elevator as shown in FIG. 5 is displayed (S2). Herein, by selecting an option from a pull-down menu and inputting data into the text box, the information about the building and the elevator of the customer is inputted. The concrete information to be inputted includes a location of a building, a site area, a number of floors, a way of use, a designed capacity of an elevator, a running speed, a number of installed elevators, a driving system (hydraulic system/rope system), the presence or the absence of a machine room, and the like. In the case of changing a contract, the registered information is retrieved by using the customer's ID number. Hence, this screen is not displayed.

In FIG. 5, by clicking the button 30 of "Next", the next screen is displayed. By clicking the button 31 of "Return", one previous screen is displayed. The subsequent screen provides the similar button by which the screen can be advanced or returned.

When the information about the customer's building and elevator is inputted, the load of the customer's elevator is predicted by the processing program on the server system (S3). The load is displayed in the format as shown in FIG. 6 (S4). The information to be displayed includes the information about a degree of load of the elevator, such as a monthly running time, a running distance, door opening and closing times (referred to as door open/close times), an average designed capacity, and the like, all of which are for one elevator. The information on the screen includes the information about the customer's elevator as well as the information about the average elevator. The customer enables to clearly grasp the degree of load of his or her own elevator by comparison with the average value.

Figure 7:
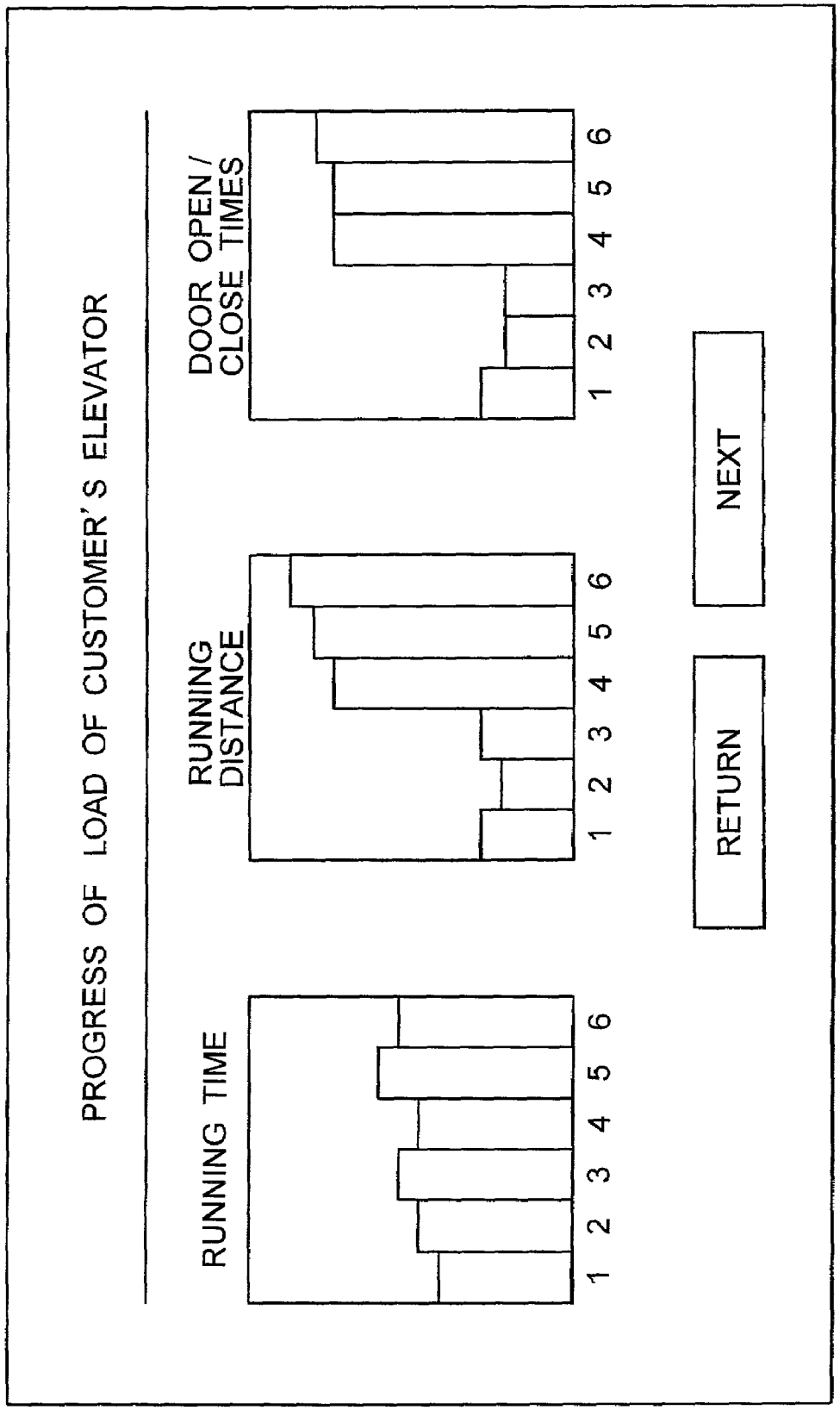
FIG. 7 is a view showing a screen on which a progress of the load of the customer's elevator is displayed in the support system for maintenance contract of an elevator.

In the case of changing a contract, these informations are not always the predicted values. In place, they may be the record values calculated on the running records measured by the remote monitoring system. As the displayed content, as shown in FIG. 7, it may be the time transition of the numeric value for representing the degree of load (S8, S9). By this, the customer gets to know the fluctuation of the load of the customer's elevator and then study the change of the maintenance content according to the load fluctuation.

Figure 8:
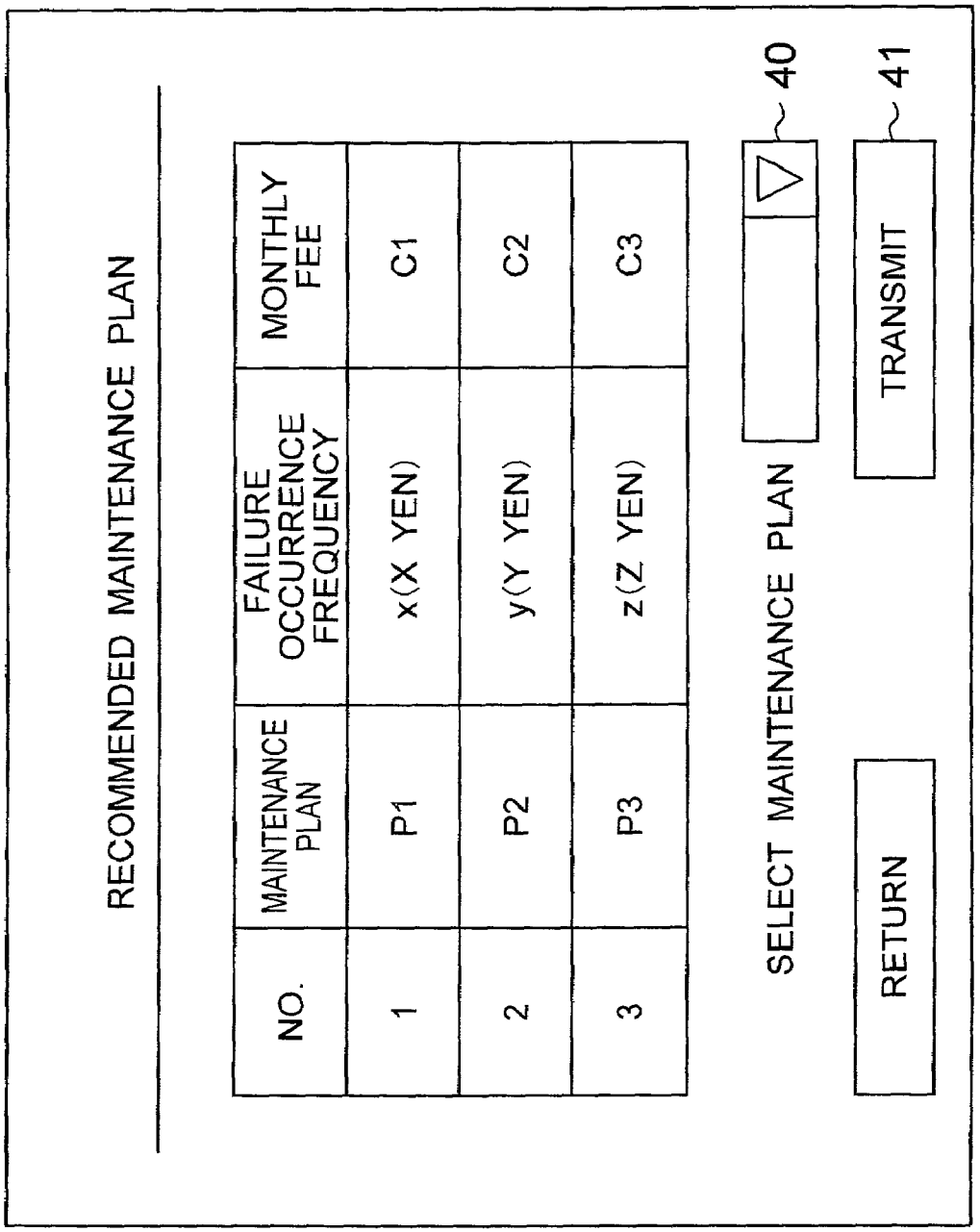
FIG. 8 is a view showing a screen on which a maintenance plan recommended to the customer's elevator is displayed in the support system for maintenance contract of an elevator.

On the next screen, the recommended maintenance plan computed (S5) by the processing program on the server system is displayed in the format as shown in FIG. 8 (S6). The information to be displayed may be the maintenance plan, a failure occurrence frequency presumed by the maintenance plan, and the cost (contract fee) taken in executing the maintenance plan, and so forth. The maintenance plan indicates a plurality of candidates, from which the preferable maintenance plan to the customer is selected by considering the failure occurrence frequency and the cost.

Herein, the frequency of failure occurrences is displayed in the form of the annual presumed times of the elevator suspension by failure or the sum of the presumed times of the elevator suspension by repairing the failure. In place, as shown in FIG. 8, the loss caused by the suspension of the elevator by failure is replaced with the format of money.

Figure 9:
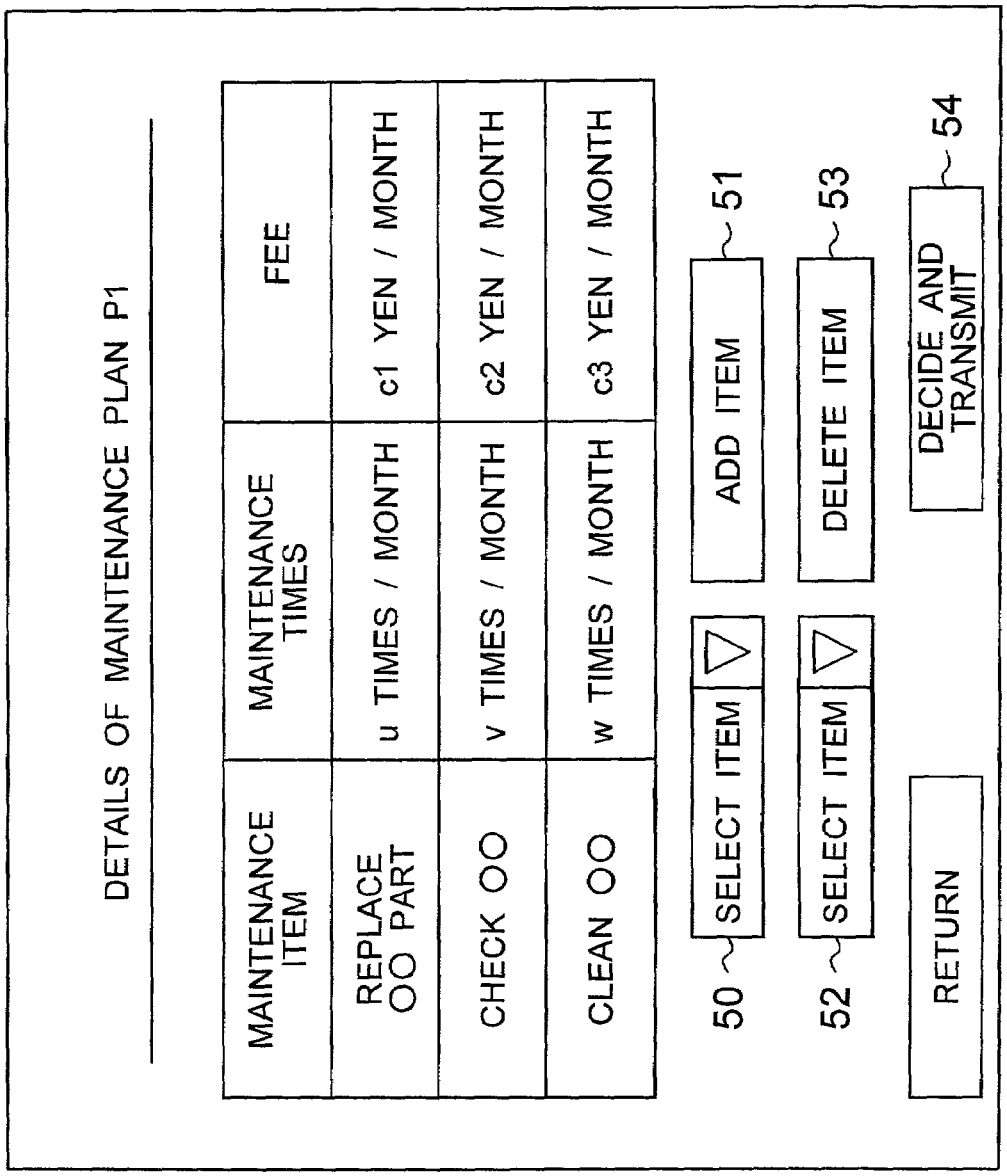
FIG. 9 is a view showing a screen on which details of the maintenance plan are displayed in the support system for maintenance contract of an elevator.

In FIG. 8, when the maintenance plan is selected by a pull-down menu 40 and a "transmit" button 41 is clicked, the detailed screen of the selected maintenance plan is displayed. Herein, the item to be executed by the maintenance plan, the periods for executing the items, and the costs charged in executing these items are displayed as shown in FIG. 9. By this, the customer can reach the details of each maintenance plan and use the decision materials in selecting the maintenance plan.

On the screen shown in FIG. 9, by selecting an option item from a pull-down menu 50 and clicking an "option item addition" button 51, an optional item may be added to the item of the maintenance plan displayed now. Further, by selecting the added option item from the pull-down menu 52 and clicking an "option item deletion" button 53, the added option item can be deleted from the menu. By this, the customer can adjust the maintenance service items as requested, such as removal of a clean-up of a cage or an entrance of the elevator from the maintenance service items because the customer takes responsibility on the clean-up.

In the case of changing a contract, the current maintenance plan and its details are displayed in combination with the recommended maintenance plan as in FIGS. 8 and 9. Then, an option item is changed in the currently set maintenance plan.

By the foregoing handling, at the stage where the selection of the maintenance plan and the adjustment of the option item are terminated, when the customer clicks a "decision transmit" button 54, the ordering content of the maintenance contract is established.

As means of actually concluding a maintenance contract, a sort of authenticating system is used on the internet so that it may be operated in succession to the foregoing operation. That is, after the customer inputs his or her address, name, phone number and credit card number, the authenticating system makes sure that these pieces of information are correct and then the maintenance contract is concluded.

In receipt of the maintenance contract on order, the service company sends the maintenance contract document to the customer so that the maintenance contract on the document base may be concluded between the customer and the service company. Further, in receipt of the maintenance contract on order, the person in charge of this case may go to the customer and then talk business deeply before concluding the maintenance contract.

Next, the description will be oriented to the details of the load predicting unit 11 of the elevator through the use of the processing program on the server system.

The load predicting unit 11 is inputted with the information about the size and the way of use of the customer's building and serves to predict the number of users of the elevator in future on the basis of the conversion table about the conventional results of the relation between the information and the number of users of the elevator. Then, the load predicting unit 11 serves to estimate the numeric values (load) of a using frequency of the elevator about a monthly running time, door open/close times and a running distance, from the numeric values of the specification of the customer's elevator such as the number of the users of the elevator, the designed capacity of the elevator, the running speed thereof and the number of the installed elevators.

In the aforementioned description, the conversion table indicates a load predicting database 12 in which the customer's database having accumulated the information about the sizes and the ways of use of the conventional customers' buildings contracted by the service company of the elevator and the information about the load of the elevator of the object building is analyzed in the form of the relation between the size and the way of use of the buildings and the number of users.

At first, the description will be oriented to the method of configuring the load predicting database 12 with reference to FIGS. 10 to 13.

The load predicting database 12 can be obtained by processing the data about lots of customers' buildings. For example, it can be obtained by analyzing the database about the customers' buildings accumulated as the customer information by the service company of the elevator.

Figure 10:
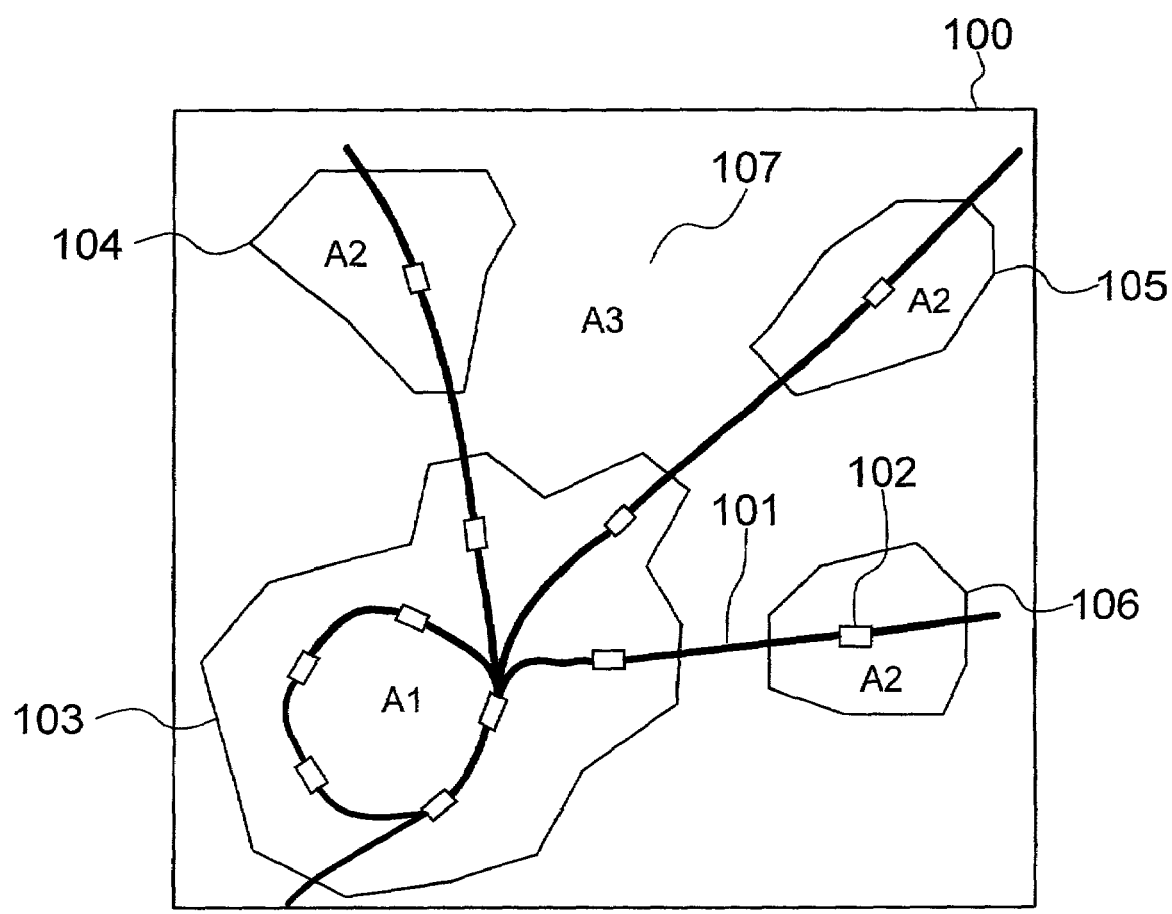
FIG. 10 is a view showing a region classifying map for classifying the customer's buildings into groups.

In the configuration of the load predicting database 12, at first, there are prepared a region classifying map 100 as shown in FIG. 10, and a site area classifying table 108, a floor number classifying table 109 and a way-of-use classifying table 110 as shown in FIGS. 11A–11C.

The region classifying map 100 is a map on which where the customer's building is located is classified, such as a place near the station, a place in a downtown, and a place with lots of traffics. Concretely, by considering the factors about traffics of crowds and cars, such as a distance from a railroad 101 or a station 102, a congestion degree of buildings and a positional relation with a trunk road as shown in FIG. 10, the map 100 is set to have an area 103 corresponding to a downtown of a big city, areas 104, 105 and 106 corresponding to a downtown of a medium-scale city, and an area 107 corresponding to the suburbs of the city. These areas may be set on the operator's sense. More strictly, however, it may be set on the actual investigation of the traffics.

The data on the region classifying map 100 may be prepared for analyzing the customer database to be discussed below by approximating each area set on the map with a polygon, for example, and storing the coordinates of a latitude and a longitude representing each vertex of the polygon.

The site area classifying table 108 is a table in which the customers' buildings are classified on the basis of the site areas. The floor number classifying table 109 is a table in which the customers' buildings are classified on the basis of the floor numbers. As the method of setting the classifying zones on each table, for example, the number of the customers' buildings is not so much shifted in each zone but is kept in a relatively large quantity, for example, 100 buildings.

The way-of-use classifying table 110 is a table in which the customers' buildings are classified according to their ways of use. For setting the classifying zones, the zones are classified according to the number of persons accessing the building, such as a domicile group like a complex, an office building group, a shop group like a department store and a station building.

In turn, the customer database owned by the service company of the elevator is analyzed by using the region classifying table 100, the site area classifying table 108, the floor number classifying table 109, and the way-of-use classifying table 110. As indicated by 111 of FIG. 12, the customer database may include a building number for identifying each building, a location of each building, a site area of each building, a number of floors of each building, a way of use of each building, and a monthly average users of each building.

At first, for the location of each building, the coordinates of the latitude and the longitude are obtained from the address for representing the location. This is obtained by searching the correspondence table between the address and the coordinates of the latitude and the longitude, for example. The process is executed to compute where the coordinates of the latitude and the longitude obtained from the address of the building belong to which of the areas of the region classifying table 100, and thereby obtain the title of the area containing the building. This is specified by comparing the coordinate value of each vertex of a polygon representing each area with the coordinate value of each building.

Next, for the site area, the floor number and the way of use of each building, they are classified according to the site area classifying table 108, the floor number classifying table 109 and the way-of-use classifying table 110. By the foregoing process, the location, the site area, the floor number and the way of use are replaced with the symbols for classifying zones. As a result, the customer database 111 is converted into the format as indicated by 112 of FIG. 12.

Figure 12:
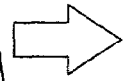
FIG. 12 is a table showing a status in which the customer's buildings are classified according to the location, the site area, the stage number and the way of use from the database for customers' buildings.

As indicated by 112 of FIG. 12, about the buildings having the same combination of the classifying symbols for the location, the site area, the floor number and the way of use, the average value of the monthly users is computed. By this operation, in the format as shown in FIG. 13, a user number predicting table 113 may be obtained which includes various combinations of a location, a site area, a floor number and a way of use and the corresponding average monthly user number. This is the content of the load predicting database 12.

The foregoing method is executed by classifying the customers' buildings into some groups with four parameters of the location, the site area, the floor number and the way of use and deriving the average user number in each group for obtaining the relation between the four parameters and the number of the users. In the foregoing embodiment, the classifying zone table is prepared when classifying the customers' building into several groups and the classification is executed on the basis of the classifying zone table. In place, the clustering method may be used. In this case, the non-numeric value items such as the location and the way of use are converted into the numeric values and then the clustering process is carried out with respect to those numeric values. For example, the location is the coordinate value of the latitude and the longitude corresponding to the location. The way of use is converted into the corresponding numeric values by means of the three-dimensional vector (domicile, office, shop) in which the corresponding item is 1 and the other one is 0. Each customer's building is represented by the vector composed of eight numeric values corresponding to the site area, the floor number and the number of users in combination to the above and the closer buildings to each other are connected in the 8-th dimensional space for classifying the buildings. However, the clustering method has difficulty in making the data items numerous and needing much time for the process.

In the foregoing description, as the parameters for deriving the number of users used are four parameters of the location, the site area, the floor number and height, and the way of use. This is not limited to four. Additional parameters may be used for obtaining the necessary predicting precision. In place, the parameters that do not contribute to the predicting precision may be excluded.

Next, the description will be oriented to the procedure (S3) for predicting the load from the information of the customer's building and the elevator itself inputted in the client system 2 through the use of the load predicting database 12.

At first, through the use of the region classifying map 100, the site area classifying table 108, the floor number classifying table 109 and the way-of-use classifying table 110, the location, the site area, the floor number and the way of use of the inputted customer's building are replaced with the symbols for the classifying zones. Then, the data matched to the combination of the obtained symbols for the classifying zones are retrieved from the user number predicting table 113 for obtaining the number of predicted users.

In turn, the monthly running time T, the door open/close times D, and the running distance L are obtained from the number of predicted users obtained by the foregoing procedure, the elevator's capacity, the running speed and the number of installed elevators and so forth inputted by the customer by the following expression.

The round time Tr in the case that the elevator goes up from the lowermost floor to the uppermost one and then goes down to the lowermost floor as stopping on each floor is calculated by the following expression 1 through the use of the floor number M of the customer's building, a height of one floor h, a running speed v of an elevator, an acceleration a in accelerating or decelerating the elevator, and a stopping time w for each floor.

$$T_r = 2(M-1)\left(\frac{h}{v} + \frac{v}{a} + w\right)$$ [Expression 1]

The expression 1 is assumed on the following running pattern between the cage floors of the elevator in which the cage is accelerated at a constant acceleration a, moved at a constant speed when the speed reaches v, and decelerated at a constant deceleration −a. In this case, the time taken in moving the cage over the distance given by the floor height h can be derived by h/v=v/a. The foregoing expression 1 is derived by multiplying an addition of the foregoing value to the stopping time w for one floor by the repeating times 2 (M−1) of the acceleration, the deceleration and the suspension in the round operation. Hence, the format of the expression 1 is variable according to the running pattern of the cage of the elevator.

Next, assuming that the elevator is running in the round operation and the same number of persons as the designed capacity are getting on and off on each floor, the number of the users to be transported in the round operation can be given by 2C (M−1) in which C is the designed capacity of the elevator. In a case that the number of the installed elevators is n, the number of the users to be transported by all the elevators is 2Cn(M−1). Assuming that the number of monthly users of the elevator is N and the same number of persons as the designed capacity for the elevator are getting on and off the elevator on each floor as the elevator is constantly running in a round operation, the repeating times nr of one round operation of the elevator for one month for handling N persons are derived by the following expression 2.

$$n_r = \frac{N}{2Cn(M-1)}$$ [Expression 2]

By multiplying the value of nr by the round time Tr, it is possible to derive the monthly running time in the case of the operation as described above. In actual, however, the persons riding in the cage of the elevator do not constantly reach the designed capacity. Further, the cage does not constantly stop each floor and all the persons are not constantly replaced with the other persons on each floor. Hence, the round times required for handling N persons are greater than the times of nr. For correcting this, a correction coefficient f is introduced. In general, as the ratio of the number of users N to the transportation capacity given by the designed capacity C×number of installed elevators n is made smaller, the transportation efficiency is made worse and the value of f is made greater. Hence, the value of f is given as a function of N/Cn. As the form of this function, the average form is pre-set by the investigated result of the actual status of the elevator and the simulation result, for example. The running time T according to the actual status is given by the following expression 3 with the correction coefficient f.

$$T = n_r \cdot T_r \cdot f\left(\frac{N}{Cn}\right)$$ [Expression 3]

In one round operation, the cage is stopped twice on each floor except the uppermost floor and the lowermost one. On each floor except the uppermost and the lowermost floors, therefore, the monthly door open/close times D for one floor is equal to a doubled value of the times of repeating the round operation of the elevator for one month. The times of the monthly round operations, provided in the case that the elevator is constantly run in the round operation and the same persons as the designed capacity are getting on and off the cage on each floor, are the value of nr indicated by the expression 2. In actual, the cage is not constantly stopped on each floor and is not constantly run in one round from the lowermost floor to the uppermost one. Hence, the correction coefficient g for correcting them is required to be introduced. In general, it is considered that as the ratio of the number of persons N to the transportation capacity given by the designed capacity C×number of installed elevators n is made smaller, the probability that the cage stops on each floor is made smaller. Hence, a value of g is given as the function of N/Cn. For the form of this function, the average function form is pre-set by the investigated result of the actual using status of the elevator and the simulation result, for example. The door open/close times D according to the actual status is given by the following expression 4 with the correction coefficient g.

$$D = 2 \cdot n_r \cdot g\left(\frac{N}{Cn}\right) \quad \text{[Expression 4]}$$

As to the doors of the uppermost floor and the lowermost one, the half of the foregoing value is used.

The monthly running distance L is equal to the value derived by multiplying the times of repeating the elevator in a round operation for one month by a distance 2 (M−1)h that the elevator is moved in one round. The times of one round for one month of nr is given by the foregoing expression 2. This is assumed that the elevator is constantly run in one round and the same persons as the designed capacity are getting on and off the cage on each floor. In actual, the elevator cage does not inevitably run from the lowermost floor to the uppermost floor in one round. Hence, a correction coefficient u for correcting it is introduced. In general, it is considered that as the ratio of the number of users N to the transportation capacity given by the designed capacity C×number of installed elevators n is made smaller, the probability that one round operation from the lowermost to the uppermost floor takes place is made smaller. Hence, the value of u is given as a function of N/Cn. For the form of this function, the average function form is pre-set by the investigated result of the actual using status of the elevator and the simulation result, for example. The running distance L according to the actual status is given by the following expression 5 with the correction coefficient u.

$$L = 2(M − 1)h \cdot n_r \cdot u\left(\frac{N}{Cn}\right) \quad \text{[Expression 5]}$$

In the aforementioned description, the expressions are used for deriving a monthly running time, the door open/close times, and the running distance in the form of correcting the value given in the case that the elevator transports the users at a maximum efficiency with a correction coefficient determined by a ratio of the number of users to the transportation capacity. The actual status does not always hold true to the status of these expressions. As a parameter for determining the correction coefficient, it is possible to introduce various factors such as a shift of the number of users on each floor and a difference of the method of managing a group of elevators.

In place of the foregoing expressions, the list is composed of a combination of the number of users, the designed capacity, the number of installed elevators, the running speed of the elevator, corresponded with the running time, the door open/close times and the running distance. The list is derived from the database having recorded the conventional results. It may be also used for deriving the foregoing values.

In the aforementioned description on the load predicting unit, the operation is executed to derive the number of the predicted users as a numeric value about the using frequency of each customer's elevator from the location, the site area, the floor number and height, and the way of use of the customer's building through the use of the load predicting database 12 and then derive a load from the specification such as the designed capacity, the running speed and the number of installed elevators. In the procedure of configuring the load predicting database 12, the customers' buildings are classified according to the total seven parameters, such as its location, its site area, its floor number, its way of use, its designed capacity of the elevator, its running speed, and the number of installed elevators. Then, the correspondence table for providing the running time, the door open/close times and the running distance for each group is configured so that the load may be directly derived from the correspondence table.

Further, if no record about the number of the average monthly users is found in the customer database but the records about the monthly running time, the door open/close times and the running distance of the elevator are found, the number of the average monthly users can be derived by performing an inverse operation of the expression 1 to 5 with respect to the records and then may be used for configuring the load predicting database.

Next, the description will be oriented to the details of the maintenance plan computing unit 14 through the use of the processing program on the server system.

The maintenance plan computing unit 14 is inputted with the numeric values about the using frequency (load 13) of the elevator, such as the monthly running time, the running distance, the door open/close times, predicted by the load predicting unit 11 and the information about the specification of the customer's elevator such as the driving system and the presence or absence of the machine room. Then, through the use of the conversion table for deriving the relation between these pieces of information and the period to the failure occurrence of the parts composing the elevator from the past results, the maintenance plan computing unit 14 is served to presume the period to the failure occurrence of the part and compute the checking item and the checking period in the maintenance plan and the failure occurrence probability in the case of maintaining the elevator according to the maintenance plan on the basis of the presumed result. Further, the computing unit 14 is also served to compute the maintenance fee cost in maintaining the elevator according to the maintenance plan on the basis of the checking item, the checking period and the number of installed elevators.

In the aforementioned description, the conversion table is made to be a maintenance plan computing database 15 derived by analyzing the maintenance recording database of the customers' elevators having been heretofore contracted by the service company of the elevator and representing the numeric values about the using frequency of the elevator and the relation between the time to the failure occurrence of each part and the specification of the elevator in the form of the table.

At first, the description will be oriented to the method of configuring the maintenance plan computing database 15 with reference to FIGS. 14A to 16.

The maintenance plan computing database 15 can be obtained by analyzing the maintenance recording database having accumulated the maintenance records having been heretofore contracted by the service company about lots of the customers' buildings.

In the configuration of the maintenance plan computing database 15, at first, there are prepared the running time classifying table 114, the door open/close times classifying table 115 and the running distance classifying table 116 as indicated in FIGS. 14A to 14C.

The running time classifying table 114, the door open/close times classifying table 115, and the running distance classifying table 116 are the tables for classifying the load of the elevator recorded in the maintenance recording database according to the length of the running time, the door open/close times, and the running distance. For the method of setting the classifying zones in each table, it is necessary to pay attention not to bring about a large deviation of the number of the elevators in each zone and not to make the number of elevators so much smaller. Concretely, it is preferable to keep the number of the elevators about one hundred (100).

Then, the maintenance recording database owned by the service company of the elevator is analyzed through the use of the running time classifying table 114, the door open/close times classifying table 115 and the running distance classifying table 116. For example, as indicated by 117 of FIG. 15, the maintenance recording database includes the elevator number for identifying each elevator, the recording date for representing a month and a year when the maintenance is executed, the accumulating running time when the maintenance is executed, the accumulated door open/close times, the accumulating running distance, and the records of replacement and clean-up of the parts A, B and C.

As to the running time, the door open/close times and the running distance, the monthly running time of each month, the monthly door open/close times and the monthly running distance can be obtained by calculating the difference from the records given when the previous maintenance is execute. Then, the average monthly running time, the average monthly door open/close times and the average monthly running distance for each elevator are derived and then are collated to the running time classifying table 114, the door open/close times classifying table 115 and the running distance classifying table 116 for determining the classifying zone.

On the other hand, as to the parts A and B, by calculating the interval from the recording data when the previous replacement is performed, it is possible to obtain the average value of the interval (months) between the replacements. As to the part C, the average value of the clean-up interval (months) can be obtained by the similar procedure.

Further, the process is executed to research the specification data of the elevator on the elevator number and then specify the driving system and the absence or the presence of the machine room from the specification data.

The foregoing process is executed to generate the middle data 118 from the maintenance recording database 117. In the middle data 118, the running time, the symbols for representing the classifying zones are used for representing the door open/close times and the running distance. The middle data 118 further includes as its items the driving system and the presence or the presence of the machine room and the interval between the replacements of the parts A and B and the clean-up interval of the part C.

In turn, as indicated by 118 of FIG. 15, the operation is executed to collect the middle data of the elevators having the same combination of the classifying symbols for representing the running time, the door open/close times and the running distance and thereby to calculate the average value and the standard deviation of the interval between the replacements of the parts A and B and the clean-up interval of the part C. This operation makes it possible to obtain the part replacement and clean-up interval predicting table 119 composed of various combinations of the classifying symbols for representing the running time, the door open/close times and the running distance as well as the average value and the standard deviation (described in blankets) of the interval between the replacements of the parts A and B and the clean-up interval of the part C corresponding to those combinations. This is the content of the maintenance plan computing database 15.

The foregoing method is executed to classify the elevators included in the maintenance recording database into several groups with three parameters of the running time, the door open/close times and the running distance and then to derive the average value and the standard deviation of the interval between the replacements of the parts and the clean-up interval in each group, thereby obtaining the relation between these three parameters and the interval between the replacements and the clean-up interval. In the foregoing embodiment, when classifying the elevators into several groups, the classifying zone table is prepared and then the classification is executed on the table. As another method, the clustering method may be used. In this method, the operation is executed to convert the non-numeric values of the driving system, the presence or the absence of the machine room and the like into the corresponding numeric values and then to perform the clustering process for classifying the elevators into several groups. For example, the items of the driving system and the presence or absence of the machine room are converted into the numeric values by means of the two-dimensional vectors. In combination with these numeric values, the vectors composed of totally 10 numeric values corresponding to the running time, the door open/close times, the running distance, the interval between the replacements of the parts A, B and C and the clean-up interval are used for representing each elevator. In the ten-dimensional space, the elevators having the closer vectors are unified into one group. However, as the data items are increased in number, the clustering method has difficulty in taking a considerably long time in processing the data.

Next, the description will be oriented to the procedure (S5) for computing the maintenance plan from the load 13 of the customer's elevator predicted by the load predicting unit 11 through the use of the maintenance plan computing database 15.

At first, the predicted running time, the door open/close times and the running distance of the customer's elevator are replaced with the corresponding classifying zone symbols through the use of the running time classifying table 114 the door open/close classifying table 115 and the running distance classifying table 116. Then, the operation is executed to retrieve the elevators matched to the combination of the obtained classifying zone symbols from the part replacement and clean-up interval predicting table 119 and then derive the average value and the standard deviation of the interval between the replacements of the parts A and B and the clean-up interval of the part C.

In turn, the operation is executed to determine the maintenance period and the period of the part replacement as considering the average value and the standard deviation of the interval between the replacements of the parts A and B and the clean-up interval of the part C.

In the conventional maintenance, the part is not replaced until the replacement is determined to be required on the current state of each part. Hence, if the part is not replaced when the replacement is determined to be required, a probability that a failure may take place is quite high. It means that the interval between the replacements of the part derived from the maintenance recording database can be interpreted as the interval of time to the failure occurrence caused because the part is not replaced.

On the other hand, if the probability density distribution of the time to a failure occurrence of a certain apparatus is given, by integrating the probability density distribution, it is possible to obtain the failure occurrence probability of the apparatus at each time point. Further, it is known that the probability density distribution on the time to the failure occurrence caused by degrade or wear is often likewise to the normal distribution.

As is obvious from the above description, it is possible to derive the relation between the interval between the replacements of the part and the failure occurrence probability by using the normal distribution determined by the average value and the standard deviation of the interval between the replacements of each relevant part picked out of the maintenance recording database.

For example, focusing on the part A, the average value of the interval between the replacements is 14 months and the standard deviation thereof is one month. Hence, the probability density function on the time to the failure occurrence caused by no replacement of the part A takes the form as indicated by 120 of FIG. 17. By integrating this, the failure occurrence probability caused by no replacement of the part A takes the form as indicated by 121.

If the maintenance is executed in which the part A is replaced at an average interval of 14 months, therefore, a failure occurrence probability may be 50%. Likewise, assuming that the interval between the replacements is 13 months, the failure occurrence probability is 16%. Assuming that the interval between the replacements is 12 months, the failure occurrence probability is substantially 0%.

The interval between the replacements and the clean-up interval of each part is selected in such a period as being well synchronized with the interval between the replacements and the clean-up interval of each part.

Figures 16, 17:
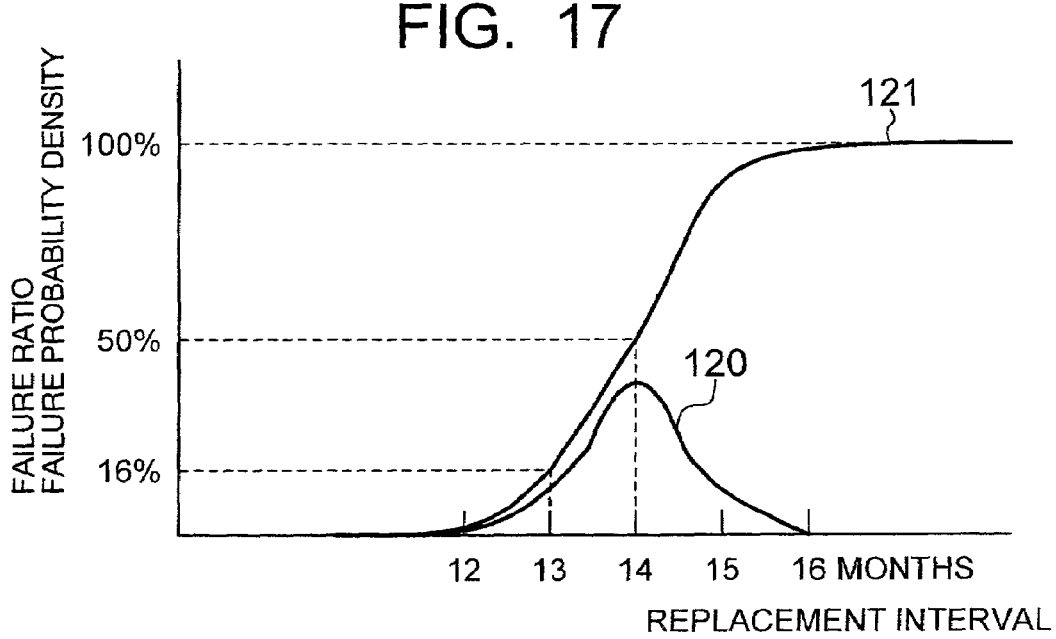
FIG. 16 is a table showing details of the maintenance plan computing database.
FIG. 17 is a graph showing a probability density until the failure occurs and a failure occurrence probability.

For example, as to the elevator having the rope system and one machine room, in which the running time, the door open/close times and the running distance are classified into T1, D1 and L1 in FIG. 16, assuming that the intervals between the replacements and of the clean-up of the part A, B or C is 12 months, 24 months, and 3 months, the failure occurrence probability about all the parts may be substantially 0% and the proper maintenance period is made to be three months.

On the other hand, assuming that the interval between the replacements of the part A or B is 13 months or 26 months and the clean-up interval of the part C is an irregular period such as 3 months, 3 months and 4 months, the maintenance frequency is somewhat lower, while the failure occurrence probability is about 16% for the part A, substantially 0% for the part B, and as high as 80% for the part C.

The maintenance plan computing unit 14 is served to search the combination of the interval between the replacements and the clean-up interval in the foregoing manner and then output the maintenance plan candidates having lower total failure occurrence probabilities in sequence.

Next, the description will be oriented to the method of computing the failure occurrence frequency about the computed maintenance plan.

It is assumed that the intervals between the replacements of the parts A and B are TA months or TB months and the failure occurrence probabilities are RA and RB. During the TA months, the probability that no failure takes place in the part A is (1−RA). The period TA is repeated 12/TA times during one year. Hence, the probability that no failure takes place in the part A for one year is $(1-R_A)^{12/T_A}$. Likewise, the probability that no failure takes place in the part B for one year is $(1-R_B)^{12/T_B}$. Hence, the probability that no failure takes place in the parts A and B for one year is a multiplication of $(1-R_A)^{12/T_A}$ by $(1-R_B)^{12/T_B}$. Conversely, the probability that at least one failure takes place in the part A or B is the above-mentioned probability from which one is subtracted, which is indicated in the following expression 6.

$$R_E = 1-(1-R_A)^{12/T_A}(1-R_B)^{12/T_B}$$ [Expression 6]

Then, assuming that a least common multiple of TA and TB is TAB, the annual failure occurrence times NE are given by subtracting the times 12RA·RB/TAB of the failure occurrences of the parts A and B on the same timing from a sum of failure occurrence times of the part A, 12RA/TA and the failure occurrence times of the part B, 12RB/TA, which is indicated by the following expression 7.

$$N_E = \frac{12}{T_A}R_A + \frac{12}{T_B}R_B - \frac{12}{T_{AB}}R_A R_B$$ [Expression 7]

Assuming that the repairing time of the failure of the part A is HA and the repairing time of the failure of the part B is HB, the annual repairing time caused by failure is a sum of the failure occurrence times of the part A multiplied by its repairing time and that of the part B multiplied by its repairing time, which is indicated by the following expression 8.

$$H_E = \frac{12}{T_A}R_A H_A + \frac{12}{T_B}R_B H_B$$ [Expression 8]

If the number of the parts is 3 or more, the expression becomes complicated. It can be derived by performing the similar calculation of the combination of the probabilities.

Then, as to the method of calculating the maintenance fee about the computed maintenance plan, assuming that the costs of the replacements of the parts A and B are CA and CB, respectively, the monthly maintenance fee CM can be obtained by monthly calculating the costs for the replacements at the replacing period, summing them and multiplying the sum by the number of the installed elevators n, which is indicated by the following expression 9.

$$C_M = n \cdot \left(\frac{1}{T_A}C_A + \frac{1}{T_B}C_B\right)$$ [Expression 9]

In actual, however, the transportation fee required for the maintenance men to go to the site and the personnel expenses of the maintenance men are added to the above-mentioned fee.

In the foregoing description about the maintenance plan computing unit, for displaying the failure occurrence frequency presumed in the case of executing the maintenance by the computed maintenance plan, the failure occurrence probability of each part of the elevator is computed. However, if no frequency of the failure occurrence to the maintenance plan is indicated, it is not necessary to compute the failure occurrence probability of the part. In this case, as the maintenance plan computing database 15, it is possible to use the replacement period table specified according to the using frequency of the elevator for each part.

In the foregoing description about the maintenance plan computing unit, the maintenance plan computing database 15 is configured by analyzing the maintenance recording database. In place, the operation may be executed to execute the endurance test of the part for checking the relation between the using period and the failure occurrence of the part and configure the maintenance plan computing database 15 on the basis of the relation between the using frequency of the elevator and the using period of the part.

The foregoing embodiment has been described on the assumption that the user number of the elevator, the running time, the door open/close times, the running distance, the part replacement and clean-up period, the failure occurrence probability, the failure occurrence times, the repairing time, and the maintenance fee are on the monthly unit or the annual unit. In actual, however, the units of those factors are not limited to the monthly or the annual unit. The convenient period for the maintenance and check or the clear period for the customer's study on the maintenance content may be used as the unit.

The foregoing embodiment has been arranged so that the support system for maintenance contract of the elevator according to the invention is configured as a client-server system. In actual, the functions of the client system and the server system are mounted on a portable computer so that all the processes may be executed in the computer. The person in charge of the service company may carry the portable computer to the customer and use the present system as talking the customer.

What is claimed is:

1. A support system to allow a consumer to obtain an offer of a plurality of selectable termed commercial maintenance contracts for elevator maintenance, comprising:
   a load prediction database storing load-values of previously known elevator sites, the load-values being stored in relation to values of a plurality of predetermined site-characteristics known to affect load-values;
   a maintenance contract database storing terms of maintenance contracts, ones of the terms being stored in relation to predetermined-load-values;
   a consumer input unit to poll a consumer to input site-values of at least a sub-plurality of the predetermined site-characteristics, pertaining to a consumer elevator site for which the offer of the plurality of selectable termed commercial maintenance contracts for elevator maintenance is desired;
   a load predicting-unit to utilize inputted site-values and the load prediction database, to automatically predict a site-load-value of the consumer elevator site;
   a maintenance plan setup-unit to utilize the predicted site-load-value and the maintenance contract database to automatically assemble the plurality of termed commercial maintenance contractual plans, with each termed commercial maintenance contractual plan having a different total failure occurrence probability; and
   a maintenance plan selecting-unit to allow the consumer to select a desired termed commercial maintenance contractual plan from said plurality of termed commercial maintenance contractual plans.

2. A support system as claimed in claim 1, comprising:
   a maintenance plan adjusting-unit to allow the consumer to adjust a desired termed commercial maintenance contractual plan from said plurality of termed commercial maintenance contractual plans.

3. A support system as claimed in claim 1, wherein a termed commercial maintenance contractual plan includes terms regarding at least one of: component parts replacement intervals; check-up intervals; and, clean-up intervals for the consumer elevator site.

4. A support system to allow a consumer to obtain an offer of a plurality of selectable termed commercial maintenance contracts for elevator maintenance, comprising:
   a load prediction database storing load-values of previously known elevator sites, the load-values being stored in relation to values of a plurality of predetermined site-characteristics known to affect load-values;
   a maintenance contract database storing terms of maintenance contracts, ones of the terms being stored in relation to predetermined-load-values;
   a consumer input unit to poll a consumer to input site-values of at least a sub-plurality of the predetermined site-characteristics, pertaining to a consumer elevator site for which the offer of the plurality of selectable termed commercial maintenance contracts for elevator maintenance is desired;
   a load predicting-unit to utilize inputted site-values and the load prediction database, to automatically predict a site-load-value of the consumer elevator site;
   a maintenance plan setup-unit to utilize the predicted site-load-value and the maintenance contract database to automatically assemble the plurality of termed commercial maintenance contractual plans, with each termed commercial maintenance contractual plan having a different total failure occurrence probability; and
   a maintenance plan selecting-unit to allow the consumer to select a desired termed commercial maintenance contractual plan from said plurality of termed commercial maintenance contractual plans,
   wherein the load predicting-unit predicts the site-load-value of the consumer elevator site, by utilizing a load-value of at least one of the previously known elevator sites having values of the plurality of predetermined site-characteristics which most closely match the inputted site-values of the consumer elevator site,
   wherein the plurality of predetermined site-characteristics known to affect load-values, include at least one site-characteristic selected from a list of: a site geographical-location; an area-size of the site; a number of floors of the site; a number of users of the site; and, a use-type of the site; and at least one elevator-characteristic selected from a list of: a designed elevator-capacity of the site; an elevator running speed of the site; a number of installed elevators at the site; and, hours of operation of elevators of the site, and
   wherein the predicted site-load-value from the load predicting-unit, includes at least two elevator-load-values selected from a list of: a monthly running time load value; a monthly running distance load value; and, a monthly door open/close times load value.

5. A support system to allow a consumer to obtain an offer of a plurality of selectable termed commercial maintenance contracts for elevator maintenance, comprising:
   a load prediction database storing load-values of previously known elevator sites, the load-values being stored in relation to values of a plurality of predetermined site-characteristics known to affect load-values;
   a maintenance contract database storing terms of maintenance contracts, ones of the terms being stored in relation to predetermined-load-values;
   a consumer input unit to poll a consumer to input site-values of at least a sub-plurality of the predetermined site-characteristics, pertaining to a consumer elevator site for which the offer of the plurality of selectable termed commercial maintenance contracts for elevator maintenance is desired;
   a load predicting means to utilize inputted site-values and the load prediction database, for automatically predicting a site-load-value of the consumer elevator site;
   a maintenance plan setup means to utilize the predicted site-load-value and the maintenance contract database, for automatically assembling the plurality of termed commercial maintenance contractual plans, with each termed commercial maintenance contractual plan having a different total failure occurrence probability; and a maintenance plan selecting-unit to allow the consumer to select a desired termed commercial maintenance contractual plan from said plurality of termed commercial maintenance contractual plans.

6. A support system as claimed in claim 5, comprising:

a maintenance plan adjusting-unit to allow the consumer to adjust a desired termed commercial maintenance contractual plan from said plurality of termed commercial maintenance contractual plans.

7. A support system as claimed in claim 5, wherein the load predicting means is for predicting the site-load-value of the consumer elevator site, by utilizing a load-value of at least one of the previously known elevator sites having values of the plurality of predetermined site-characteristics which most closely match the inputted site-values of the consumer elevator site.

8. A support system as claimed in claim 5, wherein the plurality of predetermined site-characteristics known to affect load-values, include at least one site-characteristic selected from a list of: a site geographical-location; an area-size of the site; a number of floors of the site; a number of users of the site; and, a use-type of the site; and at least one elevator-characteristic selected from a list of: a designed elevator-capacity of the site; an elevator running speed of the site; a number of installed elevators at the site; and, hours of operation of elevators of the site.

9. A support system as claimed in claim 5, wherein the predicted site-load-value from the load predicting-unit, includes at least two elevator-load-values selected from a list of: a monthly running time load value; a monthly running distance load value; and, a monthly door open/close times load value.

10. A support system as claimed in claim 5, wherein a termed commercial maintenance contractual plan includes terms regarding at least one of: component parts replacement intervals; check-up intervals; and, clean-up intervals for the consumer elevator site.

11. One or more machine-readable medium containing a support system to allow a consumer to obtain an offer of a plurality of selectable termed commercial maintenance contracts for elevator maintenance, the medium containing a load prediction database, a maintenance contract database, and at least one sequence of instructions that, when executed, causes a machine to effect:

a consumer input unit to poll a consumer to input site-values of at least a sub-plurality of the predetermined site-characteristics, pertaining to a consumer elevator site for which the offer of the plurality of selectable termed commercial maintenance contracts for elevator maintenance is desired;

a load predicting-unit to utilize inputted site-values and the load prediction database, to automatically predict a site-load-value of the consumer elevator site;

a maintenance plan setup-unit to utilize the predicted site-load-value and the maintenance contract database to automatically assemble the plurality of termed commercial maintenance contractual plans, with each termed commercial maintenance contractual plan having a different total failure occurrence probability; and a maintenance plan selecting-unit to allow the consumer to select a desired termed commercial maintenance contractual plan from said plurality of termed commercial maintenance contractual plans, wherein the load prediction database storing load-values of previously known elevator sites, the load-values being stored in relation to values of a plurality of predetermined site-characteristics known to affect load-values; and wherein the maintenance contract database storing terms of maintenance contracts, ones of the terms being stored in relation to predetermined-load-values.

12. The medium as claimed in claim 11, comprising the at least one sequence of instructions that, when executed, causes the machine to effect:

a maintenance plan adjusting-unit to allow the consumer to adjust a desired termed commercial maintenance contractual plan from said plurality of termed commercial maintenance contractual plans.

13. The medium as claimed in claim 11, wherein the load predicting-unit predicts the site-load-value of the consumer elevator site, by utilizing a load-value of at least one of the previously known elevator sites having values of the plurality of predetermined site-characteristics which most closely match the inputted site-values of the consumer elevator site.

14. The medium as claimed in claim 11, wherein the plurality of predetermined site-characteristics known to affect load-values, include at least one site-characteristic selected from a list of: a site geographical-location; an area-size of the site; a number of floors of the site; a number of users of the site; and, a use-type of the site; and at least one elevator-characteristic selected from a list of: a designed elevator-capacity of the site; an elevator running speed of the site; a number of installed elevators at the site; and, hours of operation of elevators of the site.

15. The medium as claimed in claim 11, wherein the predicted site-load-value from the load predicting-unit, includes at least two elevator-load-values selected from a list of: a monthly running time load value; a monthly running distance load value; and, a monthly door open/close times load value.

16. The medium as claimed in claim 11, wherein a termed commercial maintenance contractual plan includes terms regarding at least one of: component parts replacement intervals; check-up intervals; and, clean-up intervals for the consumer elevator site.

17. The medium as claimed in claim 11, wherein the machine is a server using the internet to provide the support system to allow the consumer to obtain an offer of the plurality of selectable termed commercial maintenance contracts for elevator maintenance, via the internet.

* * * * *